Jan. 8, 1946.  W. T. STEPHENS  2,392,421

HYDRAULIC CONTROL VALVE

Filed Aug. 24, 1942

Inventor
WILLIAM T. STEPHENS

By *Leek & Radue*

Attorneys

Patented Jan. 8, 1946

UNITED STATES PATENT OFFICE 2,392,421

HYDRAULIC CONTROL VALVE

William T. Stephens, Cleveland, Ohio, assignor to Hydraulic Control Engineering Company, Cleveland, Ohio, a corporation of Ohio Application August 24, 1942, Serial No. 455,955

14 Claims. (Cl. 277—60)

This invention relates to a hydraulic fluid control valve for use in controlling single and multiple hoists or rams, oil motors, vehicle brakes, machine tools, and the like, and, more particularly, to a hydraulic valve that will give the operator minute control of the machine to which it is connected and protect the mechanism operated in the event of overload or jamming.

An object of the invention is to provide a rugged control valve of simple construction by means of which oil motors, double-acting hoists, or a series of single-acting hoists, may be operated without jerk or shock in starting and stopping in addition to braking and locking the mechanisms at any desired point in their operation.

Another object is to provide a hydraulic control valve having a self-contained relief valve, the cracking or setting of which is dependent on the position e. g., the travel of the main operating valve plunger. The valve plunger is so arranged so as to be able to travel sufficiently to produce a pressure on the relief valve equivalent to or slightly greater than the hydraulic fluid pressure required to operate the oil motor, hoist, or the like, before any movement is imparted to the device.

A still further object is to incorporate in such a control device valve plungers wherein the inner faces or side walls of the lands are slightly tapered whereby the valve plungers may be gradually registered with the transverse oil passages in the valve casing to eliminate jerks and shock and insure smooth operation of the device receiving the hydraulic fluid pressure through the control valve.

Figure 1:
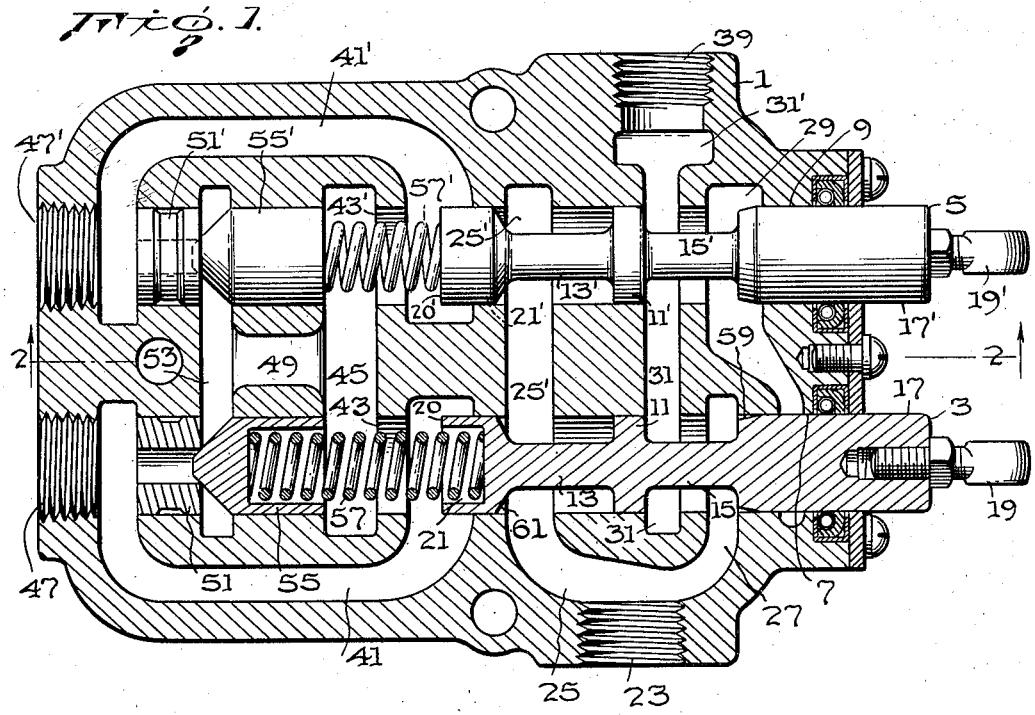
Figure 2:
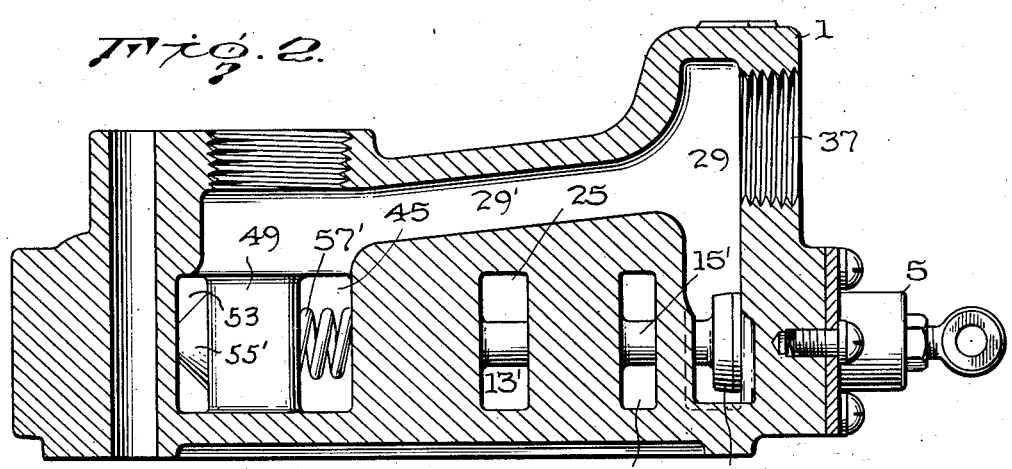

In the accompanying drawing:

Figure 1 is a transverse view partly in cross section of the control valve per se, it being understood that this valve may be placed in any suitable closed hydraulic fluid circuit for operating various hydraulic fluid energized instrumentalities; and Figure 2 is a vertical cross section through the control valve taken on line 2—2 of Fig. 1, and looking in the direction of the arrows.

The valve casing 1 is provided with two identical reciprocable valve plungers 3 and 5 mounted in spaced parallel bores 7 and 9, respectively, extending through the casing. Each plunger comprises a cylindrical member having central lands 11 and 11' with adjacent reduced sections or grooves 13, 13' and 15, 15', respectively. The outer solid portions 17 and 17' of the plungers are fitted with screw eyes 19 and 19' for connection to suitable operating linkages or levers, while the enlarged inner cylindrical ends 20 and 20' of the plungers beyond the grooves 13 and 13' are formed with central sockets or depressions 21 and 21'.

In neutral or inoperative position, as shown in the drawings, high pressure oil enters the valve casing from a suitable pump or other pressure fluid means, not shown, through inlet port 23 and passes into branch passages 25 and 27. The oil in passage 25 and its continuation 25' is blocked from further movement by lands 11 and 20 of plunger 3 and lands 11' and 20' of plunger 5. The oil in passage 27, however, flows across the groove 15 to low pressure passages 31 and thence across groove 15' to discharge passage 29 and back to the tank or reservoir via outlet port 37 and a suitable piping system. If desirable, the discharge passage 29 may also be augmented by passing the oil through portion 31' of passage 31 after removing plug 39.

As a typical example, it is assumed that the valve is placed in a fluid line leading to and from an oil motor that may be driven in either direction. In operation, when valve plunger 3, controlling the clockwise rotation of the motor (not shown), is moved inward a short distance, high pressure oil enters the casing 1 through inlet port 23, passes around the groove 13 of plunger 3 and flows to passage 41. This initial movement permits the groove 13 to bridge the passages 25 and 41 and simultaneously the movement of enlarged end 21 of the plunger blocks any oil flowing into passage 43 that communicates with transverse passage 45. This initial movement also prevents the flow of oil from passages 27 to 31 by reason of the new position of the enlarged portion 17 of the plunger 3 closing off communication therebetween.

Thus, oil circulates through inlet port 23, around groove 13 into passage 41 and into outlet port 47 that is connected by a suitable conduit to an oil motor or other desired mechanism for utilizing the energy of the pressure fluid. It will be observed that the oil in the upper part 25' of passage 25 is blocked by the land 11' of valve plunger 5 from flowing to discharge passage 29.

After driving the oil motor or other instrumentality the oil returned therefrom enters the upper port 47' and flows through passages 41', 43', 45 and 49 which communicate with longitudinal side passage 29' opening into main discharge passage 29, thence to the tank or reservoir by means of port 37.

The inner ends of each parallel bore 7 and 9 are fitted with apertured bushings or valve seats 51, 51' between the outer inturned end portions of passages 41 and 41' and the transverse passage 53. This passage is joined to transverse passage 45 by longitudinal passage 49. These apertured valve seats 51 and 51' are normally closed by relief valve plungers 55 and 55', respectively, under the influence of coil springs 57, 57' confined within the skirts of the relief valve plungers 55, 55' and the sockets 21, 21' of the main valve plungers. Consequently, the springs not only hold the relief valve plungers on their seats but also oppose inward movement of the main valve plungers and, thus, the amount of this inward movement determines the setting or operation of the relief valves.

Thus, if valve plunger 3 is operated to allow oil to flow to outlet 47 and rotate the oil motor in clockwise direction or if an excessive oil pressure due to a jam or stoppage in the oil motor or other device receiving energizing oil from the valve occurs, the excessive back pressure builds up to a point where the relief valve 55 is unseated or cracked. The oil in the normal discharge line 47 then by-passes through the bore in valve seat 51 and by forcing the relief valve plunger 55 against the tension of its spring 57 passes to the reservoir or tank of the system through passages 53, 49, 29', 29, and discharge port 37.

When the plunger 3 is in neutral or inoperative position and the plunger 5 is depressed to obtain a reverse movement of the oil motor or other device, the high pressure oil enters port 23, and flows through port 47' via passages 25, 25', groove 13' and passage 41'. Passage 31 is blocked at its upper end by plunger 5 to prevent flow of oil into passage 29 so that the low pressure return oil enters and passes through port 47, passages 41, 43, 45, 49, 29', 29 and outlet 37 back to the reservoir tank of the oil system.

If the jamming or stoppage occurs during counterclockwise movement of the oil motor during the period that oil is flowing outwardly through the valve from port 47' by operation of valve plunger 5, the excessive back pressure built up will then unseat relief valve plunger 55' and the oil circulates through the aperture in the valve seat 51' to lift the relief valve plug 55' and thence through passages 53, 49, 29' and 29 to discharge port 37.

An additional feature of control available with this form of hydraulic valve structure is the manner in which the oil motor or other operating device may be positively held or locked. This is accomplished by depressing both plungers 3 and 5 simultaneously whereby the high pressure oil will discharge from both ports 47 and 47' to form a pressure block on both sides of the motor and prevent any movement therein. When this action is desired, and the plungers are operated, oil flows into passages 25 and 25', 41 and 41', into outlets 47 and 47' where the motor creates a back pressure, thus lifting relief valve plungers 55, 55' from their seats 51 and 51' to enable the oil to circulate into passage 53 and through 49 to outlet 37.

Inasmuch as the settings of the relief valves 55 and 55' are dependent upon the travel or inward movement of the operating plungers and the travel of the plungers must be sufficient to produce a pressure equal to or slightly in excess of that required to operate the hydraulic motor or device before any movement occurs therein the operator has full and positive control thereover to a degree not possible in conventional types of control valves.

Furthermore, the beveled or sloping inner end surfaces 59 and 61 formed on the lands 20, 20' and 17, 17' permits a smooth, non-jarring flow of oil through the various passages of the valves and insures a steady, continuous action of the valve plungers without shock or jerk. This smoothness of operation is further enhanced by the fact that the lands of the valve plungers are so constructed that oil from passages 25 and 25' may enter passages 41 or 41' before passages 27 or 31 are cut off from discharge passage 29.

It will also be appreciated that in the event of a sudden overload or stoppage and consequent excessive internal pressure that the relief valve plungers 55 and 55' will be readily lifted from their seats 51 and 51' at any pressure above that necessary to operate the oil motor or other device to which the system is coupled.

When it is desired to brake the instrumentality receiving oil pressure through the valve and particularly after the device has been in operation through the oil circuit controlled by plunger 3, and the second plunger 5 is put in operation to build up a back pressure on the device, some oil in passage 25' will by-pass to passage 41' by way of groove 13' and due to the position of the valve plunger the passage 43' is blocked by the end 20' of the plunger. This builds up pressure in the normal return path of the motor. While the build up of pressure in the return side may be sufficient to crack the relief valve plunger 55' and lift the plunger from its seat, the operator may control this by continuously pressing inwardly the valve plunger 5 to maintain a maximum pressure on the plunger which will eventually cause a complete stoppage of the oil pressure and brake the motor.

What I claim is:

1. A hydraulic control valve comprising a casing having a hydraulic fluid inlet and exhaust, bores extending through said casing, each bore having a manually shiftable valve plunger therein, separate motor ports each controlled independently by one of said plungers and additional normally closed valves limiting the back pressures created in said motor ports, the closing pressures of said additional valves each being independently under the control of the corresponding shiftable valve plunger.

2. A hydraulic control valve comprising a casing having a hydraulic fluid inlet and hydraulic fluid exhaust channel, a passage connecting said inlet and channel, spaced parallel bores extending into said casing and through said passage, reciprocable valve plungers in said bores, each adapted to close said passage when moved from a repose position, motor ports in said casing, passages leading from said inlet to said motor ports and controlled by said reciprocable plungers, an exhaust passage in communication with said last mentioned passages, and spring pressed valves normally blocking said exhaust passage.

3. A hydraulic control valve as defined in claim 2 wherein means are provided to directly regulate the spring tension on each of said valves, said means acting in accordance with the position of the corresponding valve plunger.

4. A hydraulic control valve as defined in claim 2 wherein the said valves each has a pocket defined by a rearwardly extending skirt portion, a socket in the forward end of each plunger, said springs being mounted each between its valve pocket and plunger socket.

5. A hydraulic control valve as defined in claim 2 wherein hydraulic fluid is controlled in its flow from said inlet to either of said motor ports by regulated movement of the corresponding valve plunger, the springs for said spring pressed valves being engaged by said plungers and adjusted in compression thereby so that movement of the valve plungers controls the release pressure of the spring pressed valves.

6. A hydraulic control valve as defined in claim 2 wherein the reciprocable valve plungers in said bores have end lands thereon for opening and closing the hydraulic fluid passages of said valve and the entrance ends of said lands are tapered on their peripheries to gradually register with said hydraulic fluid passages when said valve plungers are reciprocated.

7. A hydraulic control valve for regulating a plurality of streams of hydraulic fluid under pressure comprising a casing having an inlet and outlet, longitudinal bores extending through said casing, reciprocable valve plungers in one end of each of said bores, motor ports at the opposite ends of said bores, transverse hydraulic fluid passages connecting said bores and said inlet and outlet, separate hydraulic fluid passages joining spaced portions of said bores and extending from the ends of said plungers and terminating adjacent the said motor ports, apertured valve seats positioned in said bores adjacent said motor ports in the opposite walls of said separate hydraulic fluid passages, valves closing said apertured seats and maintained in position thereagainst by springs connecting said valves and valve plungers.

8. A hydraulic control valve for use between a double acting hydraulic motor and a pump and reservoir combination, comprising in combination a housing having an inlet port adapted for connection to the pump, an outlet port adapted for connection to the reservoir and a pair of motor ports adapted to circulate oil to the motor, a normally open passage in said casing connecting the inlet and outlet ports, a pair of bores extending into said casing and intersecting said passage, a valve plunger in each bore, said valves being serially in control of said passage and normally spring pressed to a repose position leaving the passage open, a pair of passages each connecting the inlet to one of said motor ports, each of said valves closing one of said last mentioned passages when in repose position and movable to open the same, each of said motor ports being connected to the outlet port when its valve is in the repose position, and means on each valve to close said last mentioned connection when moved to open the motor port to the inlet.

9. A hydraulic control valve for use between a double acting hydraulic motor and a pump and reservoir combination, comprising in combination a housing having an inlet port adapted for connection to the pump, an outlet port adapted for connection to the reservoir and a pair of motor ports adapted to circulate oil to the motor, a normally open passage in said casing connecting the inlet and outlet ports, a pair of bores extending into said casing and intersecting said passage, a valve plunger in each bore, said valves being serially in control of said passage and normally spring pressed to a repose position leaving the passage open, a pair of passages each connecting the inlet to one of said motor ports, each of said valves closing one of said last mentioned passages when in repose position and movable to open the same, each of said motor ports being connected to the outlet port when its valve is in the repose position, means on each valve to close said last mentioned connection when moved to open the motor port to the inlet, and a relief valve opening from each motor port to the outlet port on excess pressure at the motor port.

10. A hydraulic control valve for use between a double acting hydraulic motor and a pump and reservoir combination, comprising in combination a housing having an inlet port adapted for connection to the pump, an outlet port adapted for connection to the reservoir and a pair of motor ports adapted to circulate oil to the motor, a normally open passage in said casing connecting the inlet and outlet ports, a pair of bores extending into said casing and intersecting said passage, a valve plunger in each bore, said valves being serially in control of said passage and normally spring pressed to a repose position leaving the passage open, a pair of passages each connecting the inlet to one of said motor ports, each of said valves closing one of said last mentioned passages when in repose position and movable to open the same, each of said motor ports being connected to the outlet port when its valve is in the repose position, means on each valve to close said last mentioned connection when moved to open the motor port to the inlet, a relief valve opening from each motor port to the outlet port on excess pressure at the motor port, a spring for each of said relief valves, each spring being abutted against the corresponding valve plunger to bias the same to repose position and whereby the pressure necessary to open a relief valve is progressively increased as the corresponding valve plunger is moved to a position to connect the related motor port to the inlet port.

11. Valve means for controlling a hydraulic device comprising in combination, a casing having a bore therethrough and a reciprocable valve plunger having lands and recesses arranged in one end of said bore, a high pressure liquid inlet and a low pressure liquid outlet for said casing, a port in said casing for connection to a hydraulic device, a passage including a portion of said bore freely connecting said inlet and outlet through a valve recess when the valve is retracted, a second passage including a portion of said bore connecting the inlet and said port and closed off by one of said lands when the valve is retracted, a relief valve in the opposite end of said bore and normally closing a port between said second passage and a duct leading to the outlet, said lands being arranged to open the second passage prior to closing the first when the valve is moved from the retracted position, said relief valve and said port for the hydraulic device being in communication at all positions of the reciprocable valve plunger.

12. Valve means for controlling a hydraulic device comprising in combination, a casing having a bore therethrough and a reciprocable valve plunger having lands and recesses arranged in one end of said bore, a high pressure liquid inlet and a low pressure liquid outlet for said casing, a port in said casing for connection to a hydraulic device, a passage including a portion of said bore freely connecting said inlet and outlet through a valve recess when the valve is retracted, a second passage including a portion of said bore connecting the inlet and said port and closed off by one of said lands when the valve is retracted, a relief valve in the opposite end of said bore and normally closing a port between said second passage and a duct leading to the outlet, and means to increase the closing tension of the relief valve as the valve plunger is moved from the retracted position.

13. Valve means for controlling a hydraulic device comprising in combination, a casing having a bore therethrough and a reciprocable valve plunger having lands and recesses arranged in one end of said bore, a high pressure liquid inlet and a low pressure liquid outlet for said casing, a port in said casing for connection to a hydraulic device, a passage including a portion of said bore freely connecting said inlet and outlet through a valve recess when the valve is retracted, a second passage including a portion of said bore connecting the inlet and said port and closed off by one of said lands when the valve is retracted, a relief valve in the opposite end of said bore and normally closing a port between said second passage and a duct leading to the outlet, and a spring interposed between said valves whereby the pressure on the relief valve is increased as the reciprocable valve is moved from the retracted position.

14. Valve means for controlling a hydraulic device comprising in combination, a casing having a bore therethrough and a reciprocable valve plunger having lands and recesses arranged in one end of said bore, a high pressure liquid inlet and a low pressure liquid outlet for said casing, a port in said casing for connection to a hydraulic device, a passage including a portion of said bore freely connecting said inlet and outlet through a valve recess when the valve is retracted, a passage including a portion of said bore connecting the inlet and said port and closed off by one of said lands when the valve is retracted, the land adjacent said valve recess and which serves to close the first mentioned passage having a tapered leading end of low slope, said first mentioned land being arranged to open the second mentioned passage before the first mentioned one is closed and having a tapered trailing end of steep slope.

WILLIAM T. STEPHENS.